(12) United States Patent
Nagasaka

(10) Patent No.: US 9,292,770 B2
(45) Date of Patent: Mar. 22, 2016

(54) INFORMATION PROCESSING APPARATUS, METHOD AND MEDIUM

(71) Applicant: CANON KABUSHIKI KAISHA, Tokyo (JP)

(72) Inventor: Hitoshi Nagasaka, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/309,777

(22) Filed: Jun. 19, 2014

(65) Prior Publication Data

US 2014/0376055 A1 Dec. 25, 2014

(30) Foreign Application Priority Data

Jun. 21, 2013 (JP) ................................. 2013-130859

(51) Int. Cl.
*G06K 15/00* (2006.01)
*G06K 15/02* (2006.01)
*H04N 1/40* (2006.01)

(52) U.S. Cl.
CPC .......... *G06K 15/181* (2013.01); *G06K 15/1815* (2013.01); *G06K 15/1814* (2013.01)

(58) Field of Classification Search
None
See application file for complete search history.

(56) References Cited

U.S. PATENT DOCUMENTS

| 5,989,422 A * | 11/1999 | Hobson .......................... 210/249 |
| 2010/0080486 A1* | 4/2010 | Maresch .............. G06K 9/2054 382/266 |
| 2014/0002865 A1* | 1/2014 | Tang .................. G06K 15/1849 358/3.26 |

FOREIGN PATENT DOCUMENTS

JP  2001-253125 A  9/2001

* cited by examiner

*Primary Examiner* — Quang N Vo
(74) *Attorney, Agent, or Firm* — Canon USA Inc. IP Division (57) ABSTRACT

An information processing method includes inputting a gradation object, rendering the input gradation object to obtain a rectangular bitmap including the rendered gradation object, generating a command for extracting pixels corresponding to the rendered gradation object from the obtained rectangular bitmap, and sending the obtained rectangular bitmap and the command for extracting the pixels from the obtained rectangular bitmap.

8 Claims, 15 Drawing Sheets

| ATTRIBUTE | ID |
|---|---:|
| NONE | 0 |
| IMAGE | 1 |
| GRAPHIC | 2 |
| TEXT | 3 |

INFORMATION PROCESSING APPARATUS, METHOD AND MEDIUM

CROSS-REFERENCE TO RELATED APPLICATIONS

This application claims the benefit of priority from Japanese Patent Application No. 2013-130859, filed Jun. 21, 2013, which is hereby incorporated by reference herein in its entirety.

BACKGROUND OF THE INVENTION

1. Field of the Invention

The present disclosure generally relates to information processing and, more particularly, to an information Processing apparatus, method and medium.

2. Description of the Related Art

A printer driver installed in a client computer receives objects from an application or OS installed in the client computer. The printer driver sends the objects to a print apparatus. The print apparatus interprets the objects, and renders the objects (i.e. draws the objects in a bitmap memory) to obtain a bitmap corresponding to the objects.

Here, if the print apparatus is old fashioned, the print apparatus cannot interpret some objects, then cannot render the objects. For example, since a gradation object has been recently invented, the old fashioned print apparatus cannot interpret this object (hereinafter, non-supported object) and cannot render this non-supported object. So, the recent printer driver interprets this non-supported object, and renders this non-supported object to obtain a bitmap. Then, the printer driver needs to send the bitmap to the old fashioned print apparatus.

Figure 15:
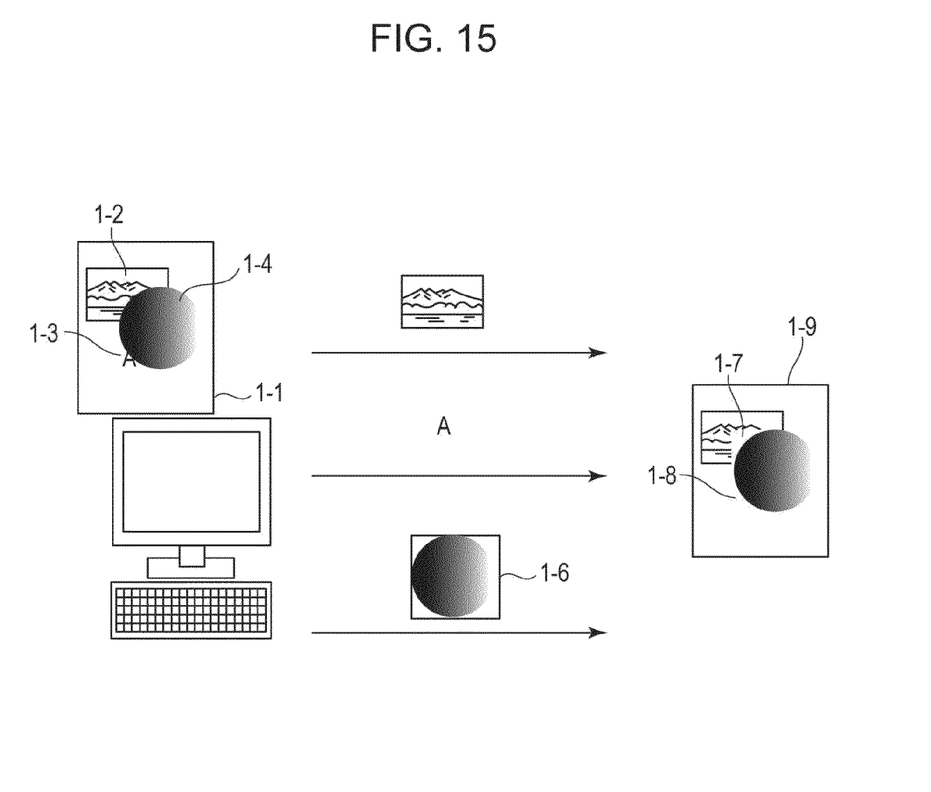
FIG. 15 is another conventional behavior of a printer driver installed in a client computer and an old fashioned print apparatus.

In addition to that, some of the old fashioned print apparatus cannot interpret a non-rectangular bitmap. So, if the non-supported object such as a gradation object 1-4 in the FIG. 15 is non-rectangular, the printer driver needs to generate a rectangular bitmap 1-6 surrounding the gradation object 1-4.

Then, the generated rectangular bitmap 1-6 are sent to the old fashioned print apparatus with a picture object 1-2, and a text object 1-3. In this result, the print apparatus generates a bitmap 1-9. At a glance, there is a problem in the bitmap 1-9 because a part of the picture object 1-7 and a part of the text object 1-8 disappear. This is because the rectangular bitmap 1-6 overwrites the part of the picture object 1-7 and the part of the text object 1-8.

If the bitmap 1-6 can include transparent pixels instead of white pixels around the rendered gradation object, this problem can be solved. But, the old fashioned print apparatus cannot interpret a bitmap including transparent pixels, so this problem cannot be solved easily.

Figure 1:
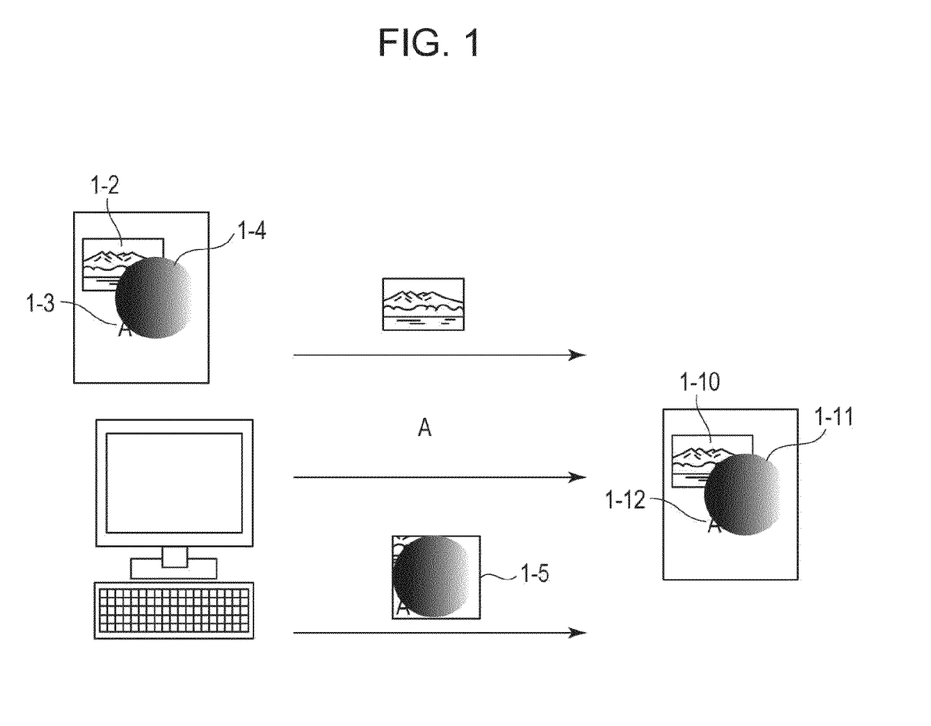
FIG. 1 is a conventional behavior of a printer driver installed in a client computer and an old fashioned print apparatus.

So, to solve this problem, conventionally the printer driver generates a rectangular bitmap 1-5 shown in the FIG. 1, then sends the rectangular bitmap 1-5 with the picture object 1-2 and the text object 1-3 to the old fashioned print apparatus. By doing so, the old fashioned print apparatus can generate a correct bitmap including rendered objects 1-10, 1-11, and 1-12.

But, the print apparatus tends to perform a blurring process on all pixels of the bitmap 1-6 included in the correct bitmap. This is because pictures, which are appropriate for the blurring process tend to be sent as a bitmap (a raw bitmap or compressed bitmap) to a print apparatus, and texts, which are appropriate for an edge enhancement process tend to be sent as a non-bitmap (e.g., character code) to a print apparatus.

In this result, the blurring process is performed on a rendered text object "A" included in the rectangular bitmap in the old fashioned print apparatus. Then, the sharpness of the text "A" has been lost.

This problem can be solved easily if the printer driver can send the bitmap 1-6 with plural attributes (e.g., "text" for some pixels and "image" for other pixels). But, there are some old fashioned print apparatus that cannot interpret plural attributes for one bitmap.

SUMMARY OF THE INVENTION

The features of the present disclosure are shown in claims. Further features of the present disclosure will become apparent from the following description of exemplary embodiments (with reference to the attached drawings).

DESCRIPTION OF THE EMBODIMENTS

Rendering data (e.g., portable document format (PDF) data, Microsoft office data) includes plural objects to be rendered. Rendering of an object means drawing the object in a bitmap memory to obtain a bitmap representing the object.

Figure 6:
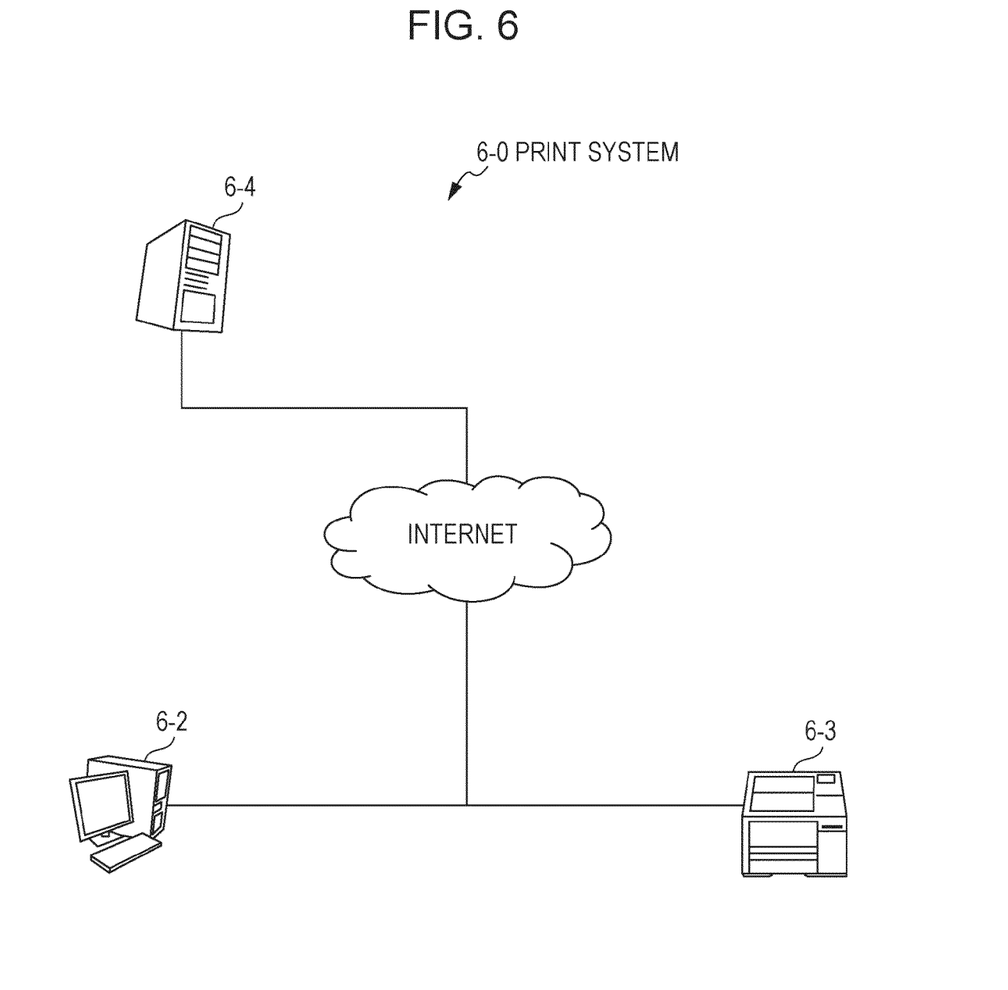
FIG. 6 is elements of a print system.

The print system 6-0 in the FIG. 6 includes a client computer 6-2, a print apparatus 6-3 connected with the client computer 6-2, and one or more servers 6-4 (hereinafter, one or more servers 6-4 are abbreviated as a server 6-4). In this embodiment, the client computer 6-2 is separate from the server 6-4. But, it is possible that the client computer 6-2 and the server 6-4 are integrated into a computer.

Figure 5:
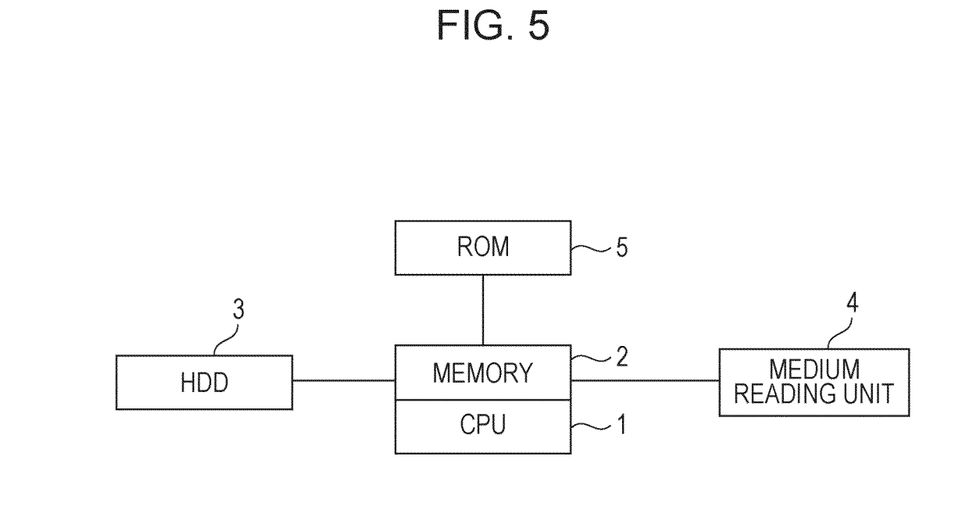
FIG. 5 is elements of a server, a client computer or a print apparatus.

As depicted in the FIG. 5, the server 6-4 includes a central processing unit (CPU) 1, a memory 2, a hard disk drive (HDD), a medium reading device for reading data from a storage medium connected with the print system 6-0 such as a Floppy Disk, a compact disc read only memory (CD-ROM), or a memory card. As used herein, the term "unit" generally refers to any combination of software, firmware, hardware, or other component that is used to effectuate a purpose.

Both the client computer 6-2 and the print apparatus 6-3 include the same elements as the server 6-4. The print apparatus 6-3 further includes a print engine.

Figure 7:
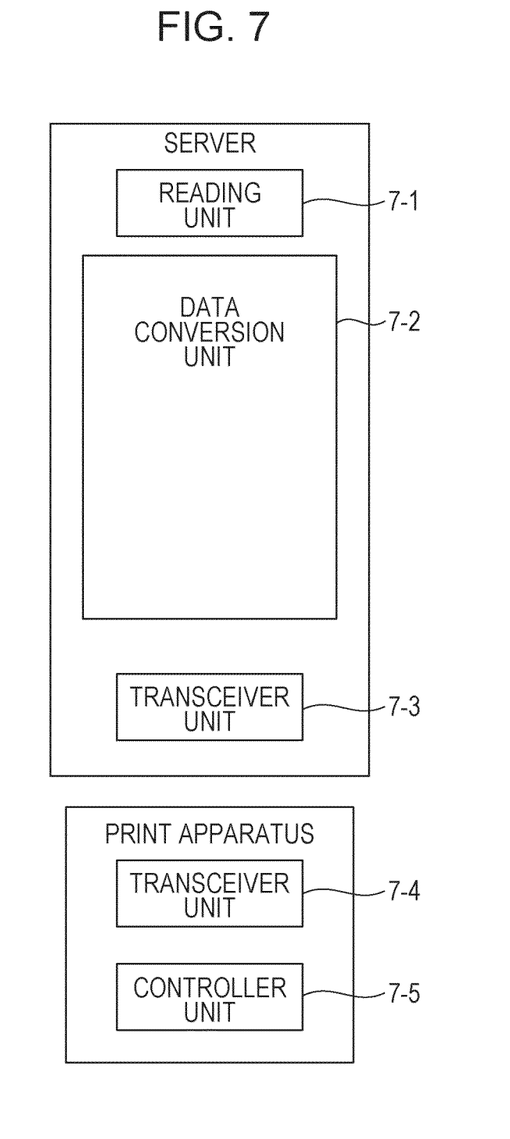
FIG. 7 is elements of a server and elements of a print apparatus.

As depicted in the FIG. 7, the server 6-4 includes a reading unit 7-1, a data conversion unit 7-2, and a transceiver unit 7-3. These units are implemented in the server 6-4 by the combination of software and the elements depicted in FIG. 5 and/or the combination of other hardware logic circuits.

The print apparatus 6-3 includes a transceiver unit 7-4 and a controller unit 7-5 which are also implemented by the combination of software and the elements depicted in FIG. 5 and/or the combination of other hardware logic circuits. The print apparatus 6-3 may be an old fashioned print apparatus described in the Description of the Related Art. That is to say, the print apparatus cannot interpret a gradation object, cannot interpret a non-rectangular bitmap, cannot interpret a bitmap including transparent pixels, and cannot interpret plural attributes for one bitmap. The client computer 6-2 and the server 6-4 performs the following process to avoid problems when the print apparatus 6-3 is old fashioned.

When an application sends rendering data to a printer driver in the client computer 6-2, the printer driver in the client computer 6-2 sends the rendering data to the server 6-4. When the server 6-4 receives the rendering data, the server 6-4 performs processes depicted in the FIG. 8.

Figure 8:
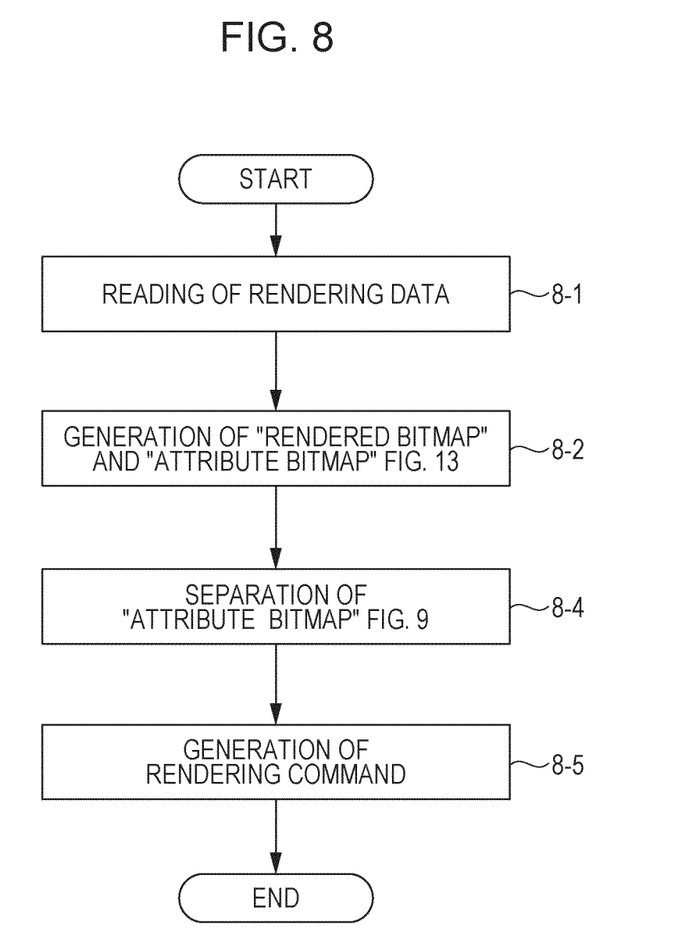
FIG. 8 is a main flowchart.

In the step 8-1, the reading unit 7-1 in the server 6-4 reads the rendering data, separates the rendering data to plural objects, and analyzes each object to obtain its attribute (e.g., "image", "graphic" or "text"). Here, if the object is a character code, the attribute "text" is obtained. If the object is a bitmap, the attribute "image" is obtained. If the object is a graphic (e.g., line, circle, or rectangle), the object is "graphic". Then, the reading unit 7-1 inputs each object and its attribute to the data conversion unit 7-2 in this step 8-1.

Figure 13:
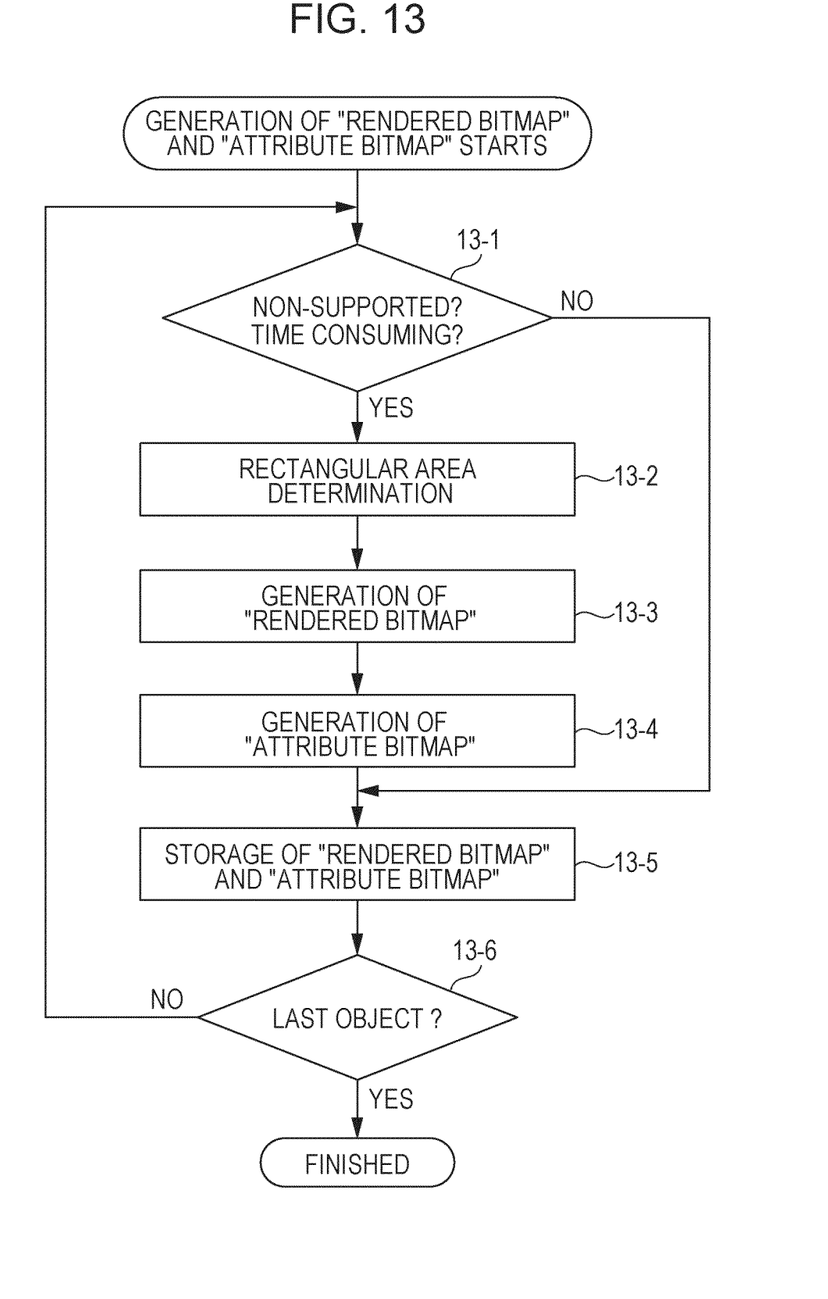
FIG. 13 depicts a sub-flowchart of 8-2 of FIG. 8.
Figure 14:
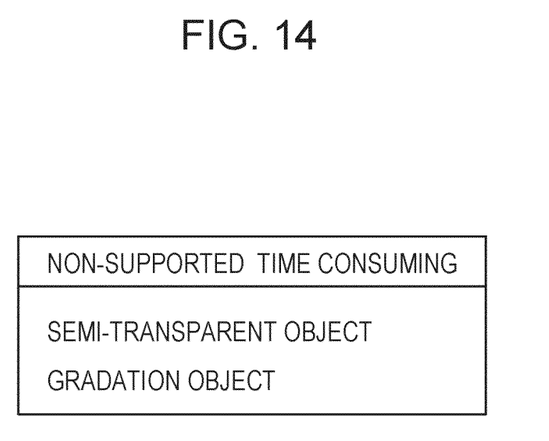
FIG. 14 is a table representing (1) non-supported object and (2) time consuming object.

The processes performed in the step 8-2 are explained below, referring to FIG. 13. In the step 13-1, the data conversion unit 7-2 selects one of the input objects, and analyzes the selected object to determine, based on a table in the FIG. 14, if the object is (1) non-supported (i.e. the print apparatus 6-3 cannot interpret the object) or (2) time-consuming (i.e. it takes more than a predetermined time by the print apparatus 6-3 to render the object). This table is stored in the data conversion unit 7-2 in advance and indicates that a gradation object and a semi-transparent object (i.e., the object for which the transparency from 1% to 99% is set) are categorized as (1) a non-supported object or (2) a time-consuming object.

If it is determined that the selected object is (1) non-supported or (2) time-consuming, the data conversion unit 7-2 proceeds to the step 13-2. Otherwise, the data conversion unit 7-2 proceeds to the step 13-5, and in the step 13-5, it stores the selected object as a rendering command.

In this step 13-2, the data conversion unit 7-2 determines a rectangular area surrounding the selected object on the basis of the shape of the selected object. This rectangular area could be an area bounding the selected object. The example of the rectangular area is shown as an outline of 3-1 in the FIG. 3. As mentioned above, the selected object may be non-rectangular.

In the step 13-3, the data conversion unit 7-2 selects all objects (e.g., a text object "A", a picture object including a mountain and sea, and a gradation object) to be rendered in the rectangular area, and renders the selected objects on the rectangular area to generate a bitmap of the rectangular area. Hereinafter, this bitmap is called as "rendered bitmap". The example of the "rendered bitmap" is shown as 3-1 of the FIG. 3. This "rendered bitmap" 3-1 includes pixels corresponding to the gradation object, the text object "A", and the picture object including the mountain and sea.

Figure 3:
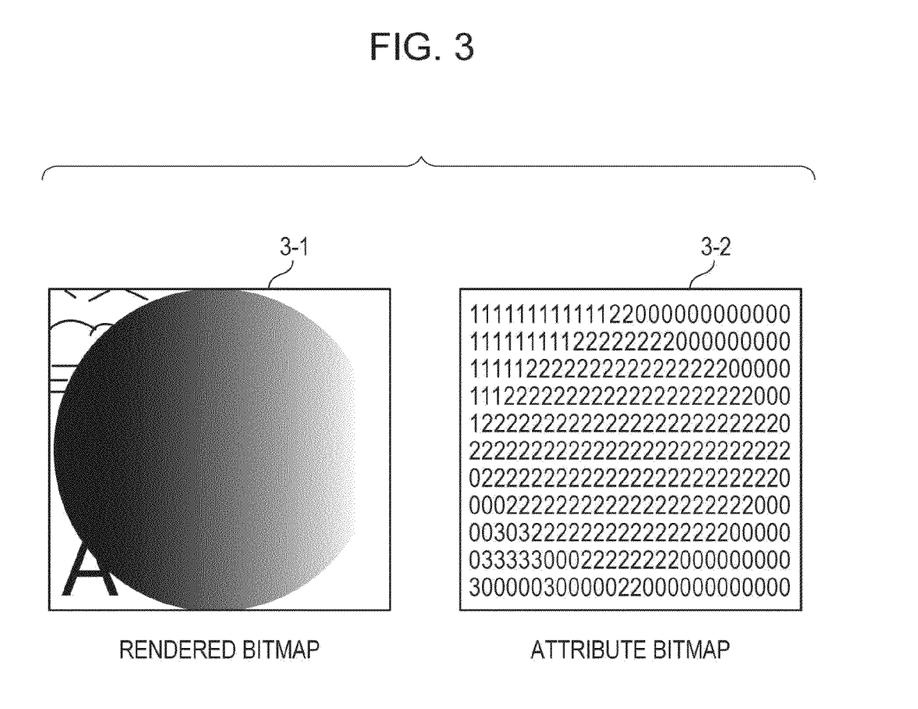
FIG. 3 depicts "rendered bitmap" and "attribute bitmap".
Figure 4:
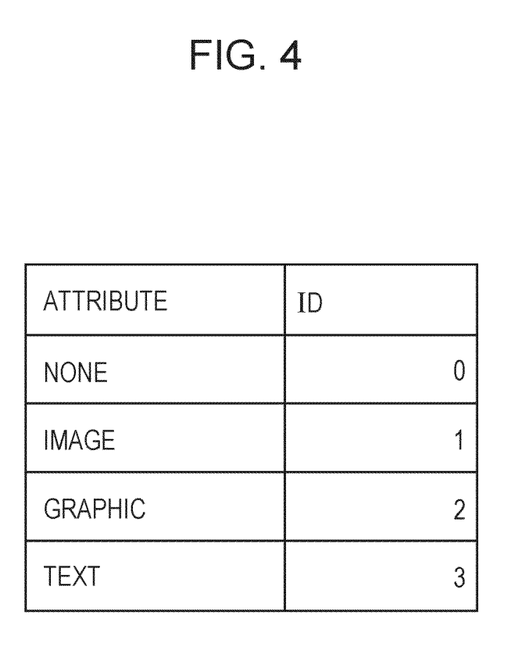
FIG. 4 is a relationship between an attribute and a value representing the attribute.

In the step 13-4, the data conversion unit 7-2 generates an "attribute bitmap" using each attribute of the selected objects. Since the attribute of the gradation object is "graphic", the attribute of the picture is "image", and the attribute of the text "A" is "text", the "attribute bitmap" shown as 3-2 is generated. FIG. 4 illustrates the relationship between 0-3 and attributes represented by 0-3.

In the step 13-5, the data conversion unit 7-2 stores the "rendered bitmap" and the "attribute bitmap" as a set. These processes are repeated by the step 13-6 until all of the objects are selected in the step 13-1. So, sometimes, plural sets of a "rendered bitmap" and a "attribute bitmap" are stored.

After all the objects are selected, the process in the step 8-4 of the FIG. 8 starts. This step 8-4 is explained below, referring to the FIG. 9.

Figure 9:
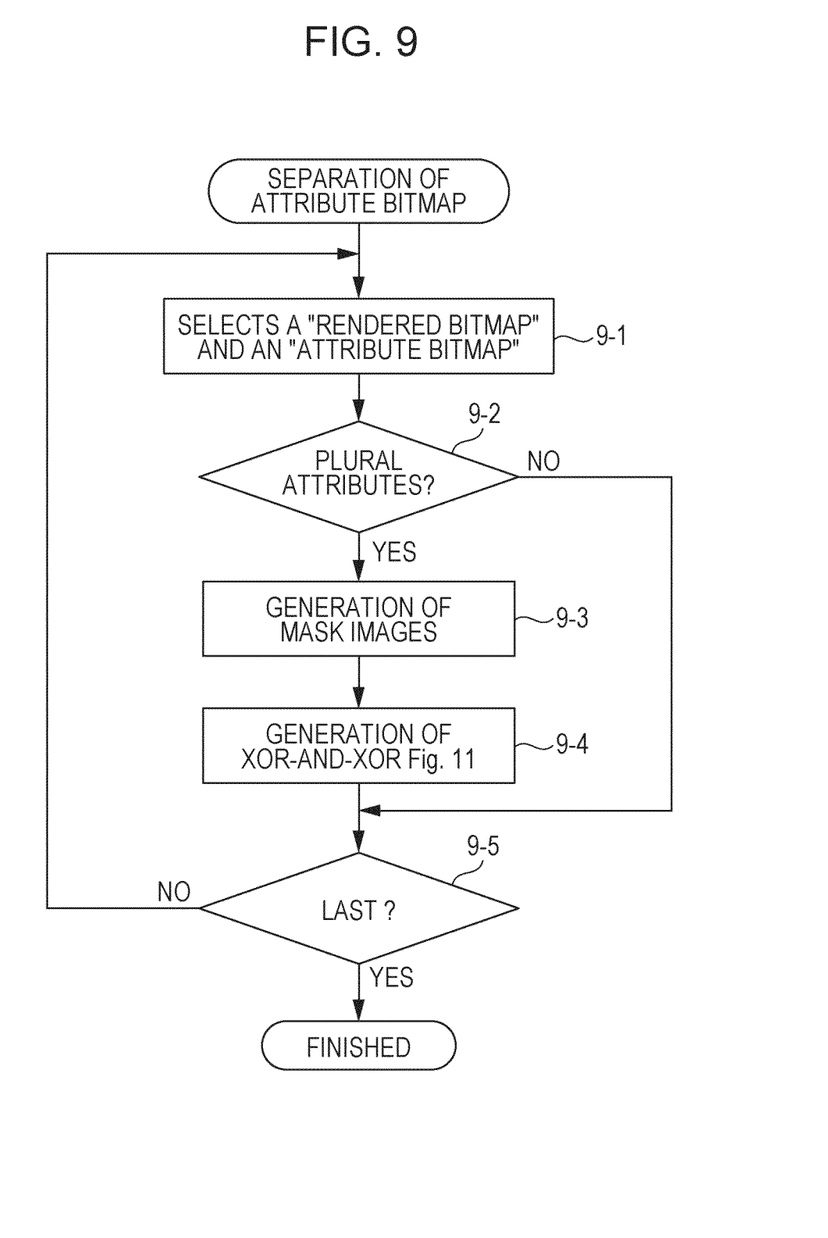
FIG. 9 is a sub-flowchart of 8-4 of FIG. 8.

In the step 9-1, the data conversion unit 7-2 selects sets of the stored "rendered bitmap" and "attribute bitmap", one by one. In the step 9-2, the data conversion unit 7-2 counts the number of the attribute types included in the selected "attribute bitmap" except "0". For example, the "attribute bitmap" 3-2 includes three types of attributes (i.e., 1:"Image", 2:"graphic", and 3:"text"). If the number is more than 1, the data conversion unit 7-2 proceeds to the step 9-3. Otherwise, the data conversion unit 7-2 stores the "rendered bitmap" and its only one attribute as a rendering command, then deletes the "attribute bitmap".

In the step 9-3, the data conversion unit 7-2 generates "Mask images", the number of which is same as the counted number from the "attribute bitmap". For example, in the case of the "attribute bitmap" 3-2, three "Mask images" are generated. Each "Mask Image" is to be used for extracting out pixels including the same attribute.

Figure 10:
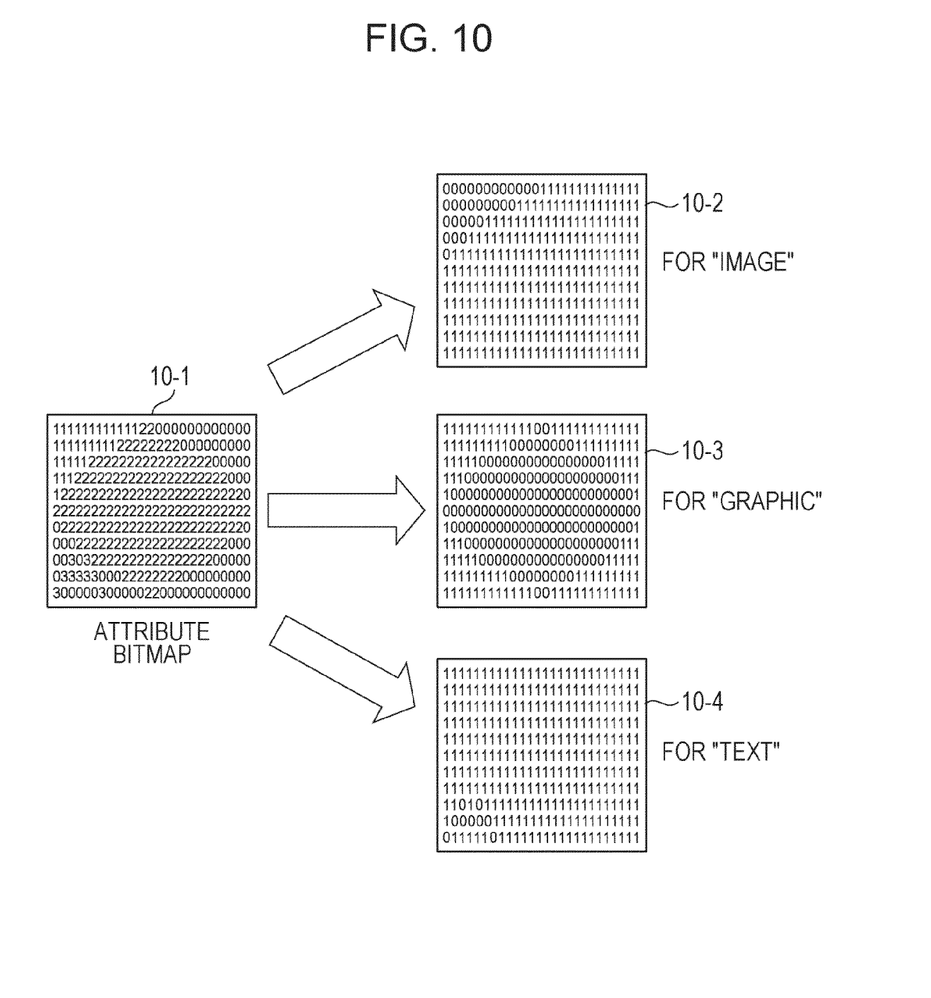
FIG. 10 depicts a generation of three "Mask Images".

Three "Mask images" are shown as 10-2, 10-3, and 10-4 in the FIG. 10. To generate "Mask Image" for "Image", the data conversion unit 7-2 extracts "Image (i.e., 1)" pixels from the "attribute bitmap" 10-1, and sets "0" to the extracted pixels and "1" to the other pixels of the "Mask Image" for "Image". By doing so, the data conversion unit 7-2 generates "Mask Images" to be used for extracting pixels corresponding to "Image" attribute.

To generate "Mask Image" for "Graphic", the data conversion unit 7-2 extracts "Graphic (i.e., 2)" pixels from the "attribute bitmap" 10-1, and sets "0" to the extracted pixels and "1" to the other pixels of the "Mask Image" for "graphic". By doing so, the data conversion unit 7-2 generates "Mask Images" to be used for extracting pixels corresponding to "Graphic" attribute. As mentioned before, since the attribute of the gradation object and the semi-transparent object is "Graphic", the print apparatus can extract out pixels corresponding to the gradation object or the semi-transparent object. Similarly, "Mask Image" for "image" is generated.

Figure 11:
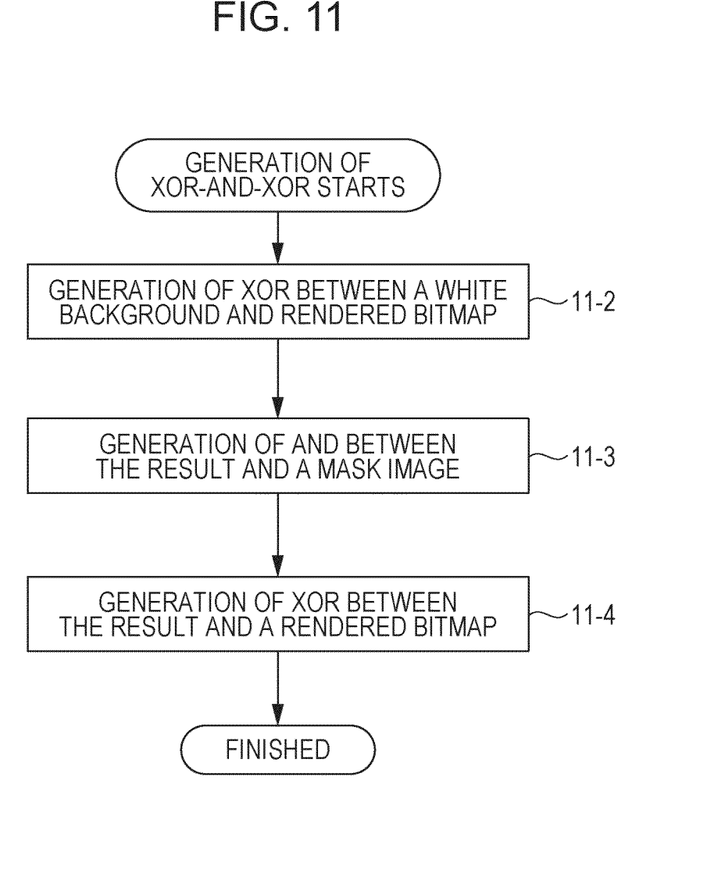
FIG. 11 is a sub-flowchart of 9-4 of FIG. 9.
Figure 12:
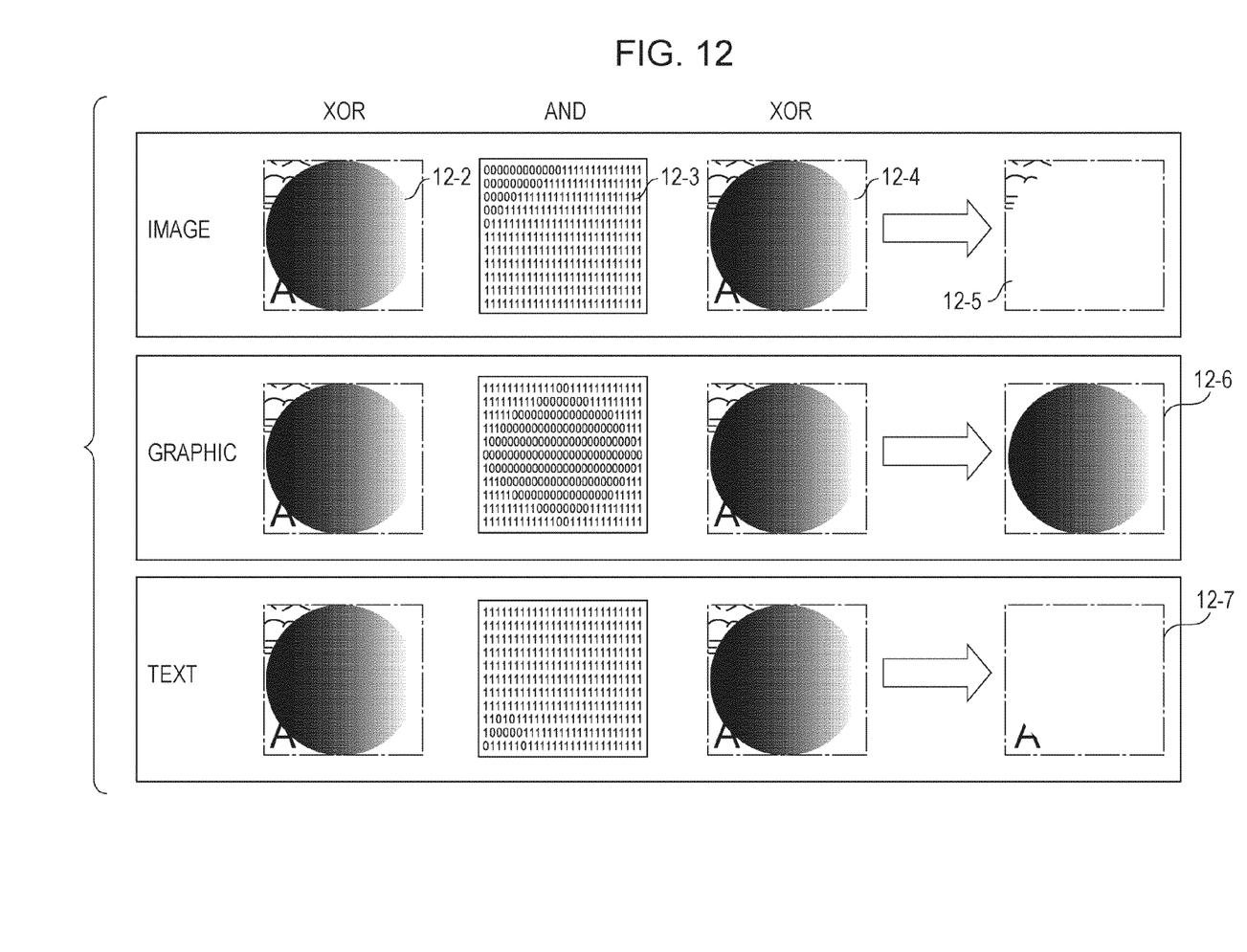
FIG. 12 depicts a result of each XOR-AND-XOR process.

Then, the data conversion unit 7-2 generates instructions for extracting out pixels corresponding to the same attribute, using the generated "Mask Images" in the step 9-4. This step 9-4 is explained in the FIG. 11 in details. Then, the data conversion unit 7-2 stores the instructions and respective attributes for the instructions as print commands. For example, the only one attribute stored with the XOR-AND-XOR instruction (12-2, 12-3, and 12-4) is "Image".

Each generated instruction includes an XOR-AND-XOR process and its only one attribute. In the step 11-2, the data conversion unit 7-2 generates the first XOR process between a white background bitmap (i.e., a background consisting of white pixels), and the "rendered bitmap". The number of pixels in height and width of the white background bitmap is same as the number of pixels in height and width of the "rendered bitmap", and same as the number of pixels in height and width of the "attribute bitmap".

In the step 11-3, the data conversion unit 7-2 generates the AND process between the result of the first XOR process and the generated "Mask Image". In the step 11-4, the data conversion unit 7-2 generates the last XOR process between the result of the AND process and the "rendered bitmap". In the case of the "attribute bitmap" 3-2, three instructions are generated because three "Mask Images" have been generated. One of the three instructions is shown as 12-2, 12-3 and 12-4 in the FIG. 12. The other instructions are shown below in the FIG. 12. The result of performing each of the three instructions is shown as 12-5, 12-6 and 12-7. In this manner, XOR-AND-XOR process can be used for extracting out pixels corresponding to the same attribute in the print apparatus.

Figures 2A, 2B:
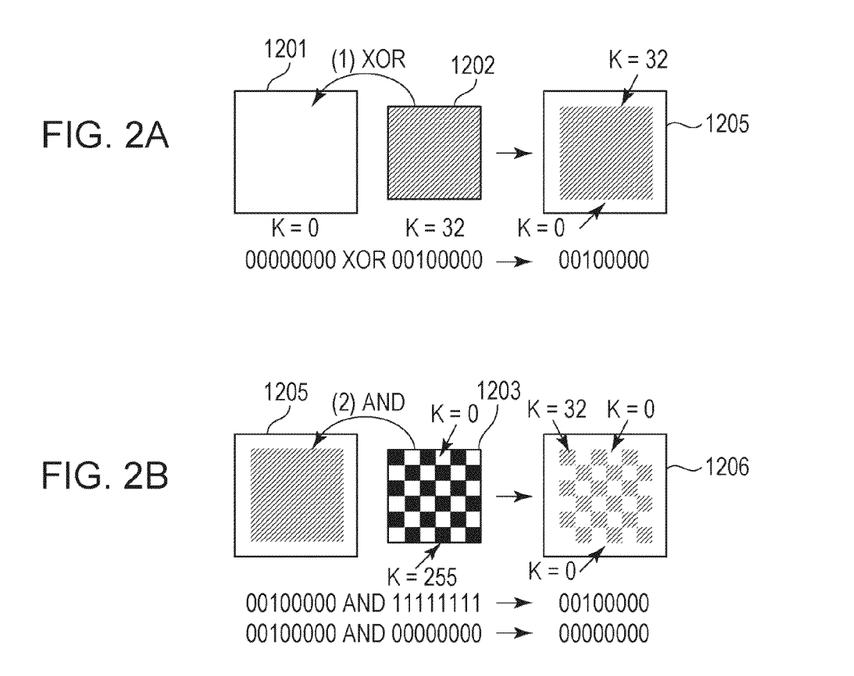
FIGS. 2A to 2C are XOR-AND-XOR processes.
Figure 2C:
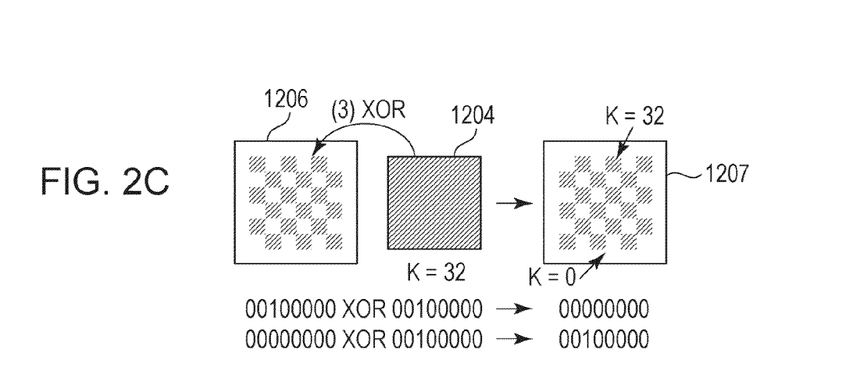

FIGS. 2A-2C illustrate the results of the XOR-AND-XOR processes. As shown in FIGS. 2A-2C, from among the pixels in the "rendered bitmap" 1202 or 1204, pixels corresponding to the masked pixels (i.e., pixels including "0") in the "mask image" 1203 are extracted out. This extraction is performed in the print apparatus 6-3. The white background is shown as 1201, the result of the first XOR process is 1205, the result of the AND process is 1206, and the result of the last XOR process is 1207.

If the selection of all the sets of a "rendered bitmap" and "attribute bitmap" has been confirmed in the step 9-5, the data conversion unit 7-2 sends all of the stored print commands to the data transceiver unit 7-3. Then the transceiver unit 7-3 sends all of the print commands to the transceiver unit 7-4 in the print apparatus 6-3 via a network.

Then, the controller unit 7-5 receives all of the print commands and interprets all of the print commands to generate a bitmap. This process includes the performance of the XOR-AND-XOR process, and so the non-supported or time-consuming object such as a gradation object or a semi-transparent object is rendered, thereby a bitmap including a gradation or semi-transparent image is generated in the controller unit 7-5.

In addition to that, the controller unit 7-5 performs the image processing on each pixel of the bitmap on the basis of the attribute. Since the print apparatus also receives one attribute for each instruction, the print apparatus can perform appropriate image processing on each pixel.

Although "Graphic" attribute and "Image" attribute are dealt with separately, it is possible that the client computer deals with "Graphic" attribute and "Image" attribute as the same attribute. In this case, the generation of one of the "Mask Images" is not necessary. Instead, the data conversion unit 7-2 needs to generate a "Mask Image" including "Image" and "Graphic" attributes in the step 9-3.

Embodiment(s) of the present disclosure can also be realized by a computer of a system or apparatus that reads out and executes computer executable instructions (e.g., one or more programs) recorded on a storage medium (which may also be referred to more fully as a 'a non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus comprising:
an input unit configured to input a gradation object;
a rendering unit configured to render the input gradation object to obtain a rectangular bitmap including the rendered gradation object;
a generation unit configured to generate a command for extracting pixels corresponding to the rendered gradation object out of the obtained rectangular bitmap; and
a send unit configured to send the obtained rectangular bitmap and the command for extracting the pixels out of the obtained rectangular bitmap,
wherein the command includes (1) XOR process between the obtained rectangular bitmap and a white rectangular bitmap, (2) AND process between a result of the XOR process and position information for indicating positions of the rendered gradation object, and (3) XOR process between the obtained rectangular bitmap and a result of the AND process.

2. An information processing method comprising:
inputting a gradation object;
rendering the input gradation object to obtain a rectangular bitmap including the rendered gradation object;
generating a command for extracting pixels corresponding to the rendered gradation object out of the obtained rectangular bitmap; and
sending the obtained rectangular bitmap and the command for extracting the pixels out of the obtained rectangular bitmap,
wherein the command includes (1) XOR process between the obtained rectangular bitmap and a white rectangular bitmap, (2) AND process between a result of the XOR process and position information for indicating positions of the rendered gradation object, and (3) XOR process between the obtained rectangular bitmap and a result of the AND process.

3. An information processing apparatus comprising:
an input unit configured to input rendering data including a plurality of objects;
a first determining unit configured to determine whether each of the plurality of objects is to be rendered as a bitmap;
a second determining unit configured to determine a rectangular area surrounding an object determined to be rendered by the first determining unit;
a rendering unit configured to select all objects to be rendered in the determined rectangular area, and render all the selected objects to generate a rendered bitmap of the rectangular area;
a first generation unit configured to generate an attribute bitmap of the rectangular area based on attributes of all the selected objects;

a second generation unit configured to generate mask images corresponding to attributes included in the attribute bitmap;

a third generation unit configured to generate, based on the generated mask images, commands for extracting pixels corresponding to each attribute from the rendered bitmap of the rectangular area; and a send unit configured to send the rendered bitmap and the command for extracting the pixels corresponding to each attribute from the rendered bitmap of the rectangular area.

4. The apparatus according to claim 3, wherein the object determined to be rendered by the first determining unit is a gradation object.

5. The apparatus according to claim 4, wherein the rectangular area determined by the second determining unit is an area bounding the gradation object.

6. The apparatus according to claim 4, wherein the rendering data input by the input unit includes not only the gradation object but also a text object, and the rendering unit selects all of the gradation object and the text object to be rendered in the determined rectangular area, and renders the selected all of the gradation object and the text object to generate the rendered bitmap of the rectangular area.

7. The apparatus according to claim 3, wherein the command includes XOR-AND-XOR process.

8. An information processing method comprising:

inputting rendering data including a plurality of objects;

determining whether each of the plurality of objects is to be rendered as a bitmap;

determining a rectangular area surrounding an object determined to be rendered;

selecting all objects to be rendered in the determined rectangular area;

rendering all the selected objects to generate a rendered bitmap of the rectangular area;

generating an attribute bitmap of the rectangular area based on attributes of all the selected objects;

generating mask images corresponding to attributes included in the attribute bitmap;

generating, based on the generated mask images, commands for extracting pixels corresponding to each attribute from the rendered bitmap of the rectangular area; and sending the rendered bitmap and the command for extracting the pixels corresponding to each attribute from the rendered bitmap of the rectangular area.

* * * * *